United States Patent
Wehling et al.

(10) Patent No.: US 9,488,727 B2
(45) Date of Patent: Nov. 8, 2016

(54) ULTRASONIC SENSOR ARRANGEMENT COMPRISING AN ULTRASONIC SENSOR IN THE RADIATOR GRILL, MOTOR VEHICLE AND CORRESPONDING METHOD

(71) Applicant: Valeo Schalter Und Sensoren GmbH, Bietigheim-Bissingen (DE)

(72) Inventors: Hans Wilhelm Wehling, Heilbronn (DE); Joerg Weyland, Brackenheim (DE); Natalie Weber, Bietigheim-Bissingen (DE); Stephan Max, Gifhorn (DE)

(73) Assignee: Valeo Schalter Und Sensoren GmbH, Bietigheim-Bissingen (DE)

( * ) Notice: Subject to any disclaimer, the term of this patent is extended or adjusted under 35 U.S.C. 154(b) by 110 days.

(21) Appl. No.: 14/415,867

(22) PCT Filed: Jul. 23, 2013

(86) PCT No.: PCT/EP2013/065505
§ 371 (c)(1),
(2) Date: Feb. 3, 2015

(87) PCT Pub. No.: WO2014/016291
PCT Pub. Date: Jan. 30, 2014

(65) Prior Publication Data
US 2015/0192673 A1    Jul. 9, 2015

(30) Foreign Application Priority Data

Jul. 24, 2012 (DE) .................. 10 2012 106 693

(51) Int. Cl.
*G01S 15/87* (2006.01)
*B60R 19/48* (2006.01)
(Continued)

(52) U.S. Cl.
CPC ........... *G01S 15/876* (2013.01); *B60R 19/483* (2013.01); *G01H 3/06* (2013.01); *G01S 7/521* (2013.01);
(Continued)

(58) Field of Classification Search
CPC . B60R 19/483; G01S 7/52004; G01S 7/521; G01S 15/876; G01S 15/931; G01S 7/54; G01S 15/878; G01S 7/524; G01S 2015/932; G01S 2015/938; G01H 3/06
See application file for complete search history.

(56) References Cited

U.S. PATENT DOCUMENTS

| 3,842,397 A | 10/1974 | Sindle |
| 7,518,491 B2 | 4/2009 | Oda et al. |
| 2015/0192673 A1* | 7/2015 | Wehling ............... B60R 19/483 367/138 |

FOREIGN PATENT DOCUMENTS

| DE | 42 38 924 A1 | 5/1994 |
| DE | 103 14 922 A1 | 10/2004 |

(Continued)

OTHER PUBLICATIONS

Translation of DE102011016287.*
(Continued)

*Primary Examiner* — Daniel Pihulic
(74) *Attorney, Agent, or Firm* — Louis Isaf; Womble Carlyle Sandridge & Rice

(57) ABSTRACT

The invention relates to an ultrasonic sensor arrangement (2) for a motor vehicle (1), comprising a trim element (3), in particular a bumper, comprising a radiator grill (4), and at least one first and one second ultrasonic sensor (5, 6) each comprising a membrane (11) for emitting and/or receiving ultrasonic signals, wherein the first ultrasonic sensor (5) with its membrane (11) is arranged on a back side of the trim element (3) so that the membrane (11) of the first ultrasonic sensor (5) is configured for emitting and/or receiving ultrasonic sensor signals through the trim element (3) and the second ultrasonic sensor (6) is arranged on the radiator grill (4). By detuning means (7, 9) the second ultrasonic sensor (6) is detuned and hereby its emission and/or receiving behavior adapted to the emission and/or receiving behavior of the first ultrasonic sensor (5).

13 Claims, 3 Drawing Sheets

Figure 1:
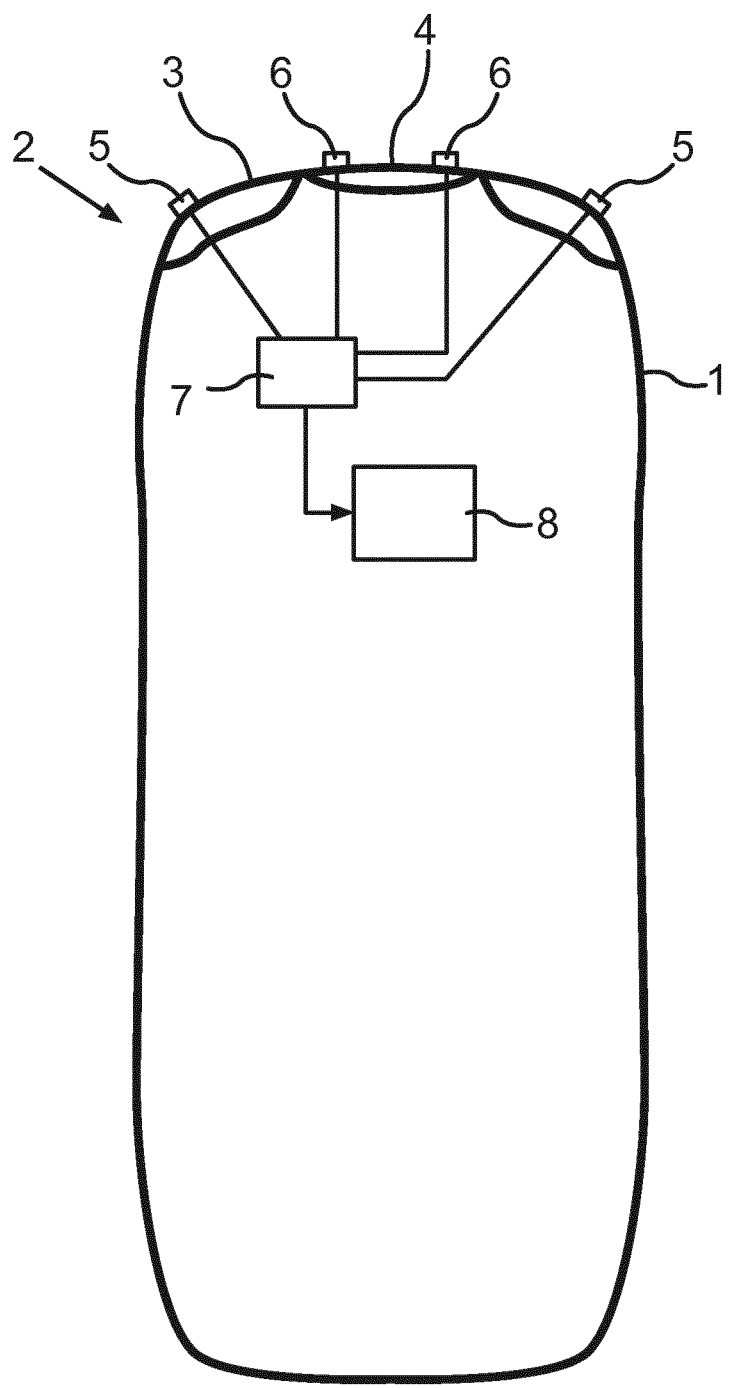

(51) Int. Cl.

| | | |
|---|---|---|
| *G01H 3/06* | (2006.01) | |
| *G01S 15/93* | (2006.01) | |
| *G01S 7/52* | (2006.01) | |
| *G01S 7/54* | (2006.01) | |
| *G01S 7/521* | (2006.01) | |
| *G01S 7/524* | (2006.01) | |

(52) U.S. Cl.
 CPC .............. *G01S 7/52004* (2013.01); *G01S 7/54* (2013.01); *G01S 15/878* (2013.01); *G01S 15/931* (2013.01); *G01S 7/524* (2013.01); *G01S 2015/932* (2013.01); *G01S 2015/938* (2013.01)

(56) References Cited

FOREIGN PATENT DOCUMENTS

| DE | 103 47 098 A1 | 5/2005 |
|---|---|---|
| DE | 10 2005 038 649 A1 | 2/2007 |
| DE | 10 2006 034 997 A1 | 2/2007 |
| DE | 10 2006 021 492 A1 | 11/2007 |
| DE | 10 2009 046 338 A1 | 5/2011 |
| DE | 10 2011 016 287 A1 | 7/2012 |
| EP | 2 293 102 A1 | 3/2011 |
| EP | 2293102 A1 | 3/2011 |
| GB | 2 272 819 A | 5/1994 |
| JP | H09281222 A | 10/1997 |
| JP | 2007038757 A | 2/2007 |
| JP | 2007212349 A | 8/2007 |
| JP | 2009058298 A | 3/2009 |

OTHER PUBLICATIONS

Translation of JP2007212349.*
Office Action dated Mar. 23, 2016 in co-pending CN application No. 201380049583.0.
Office Action dated Feb. 23, 2016 in co-pending JP application No. 2015-523529, filed Jul. 23, 2013.
International Preliminary Report on Patentability (Chapter I of the Patent Cooperation Treaty) for International Application No. PCT/EP2013/065505, filed Jul. 23, 2013, Valeo Schalter Und Sensoren GmbH.

* cited by examiner

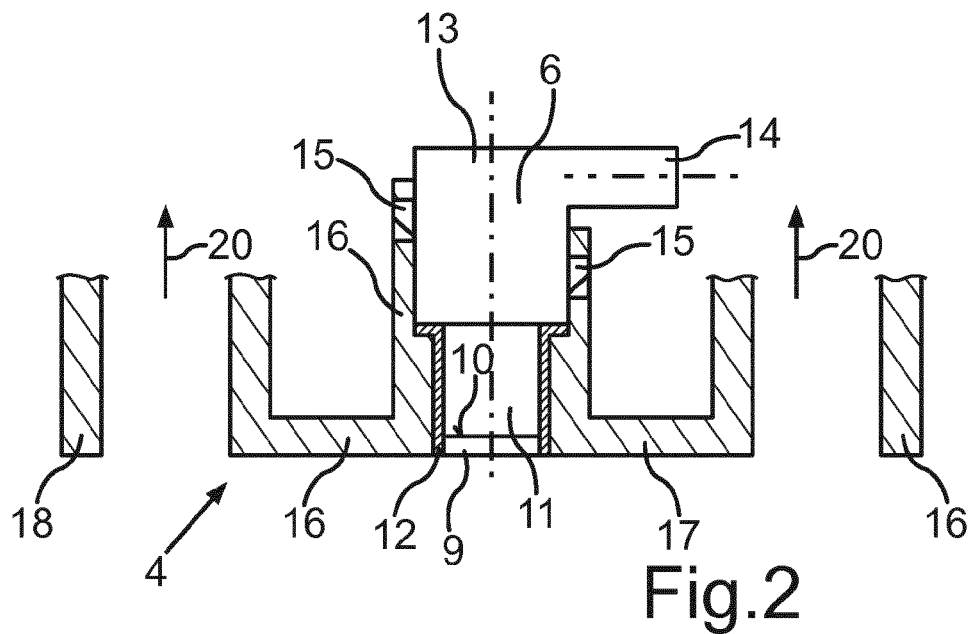
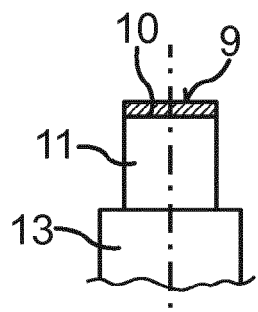 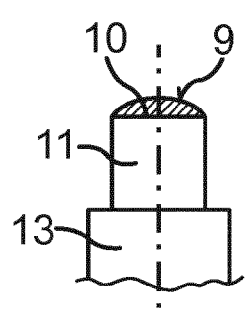 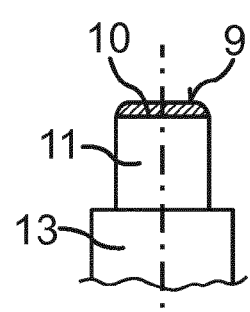
Fig.3a  Fig.3b  Fig.3c

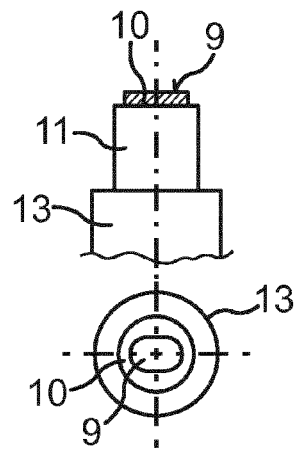 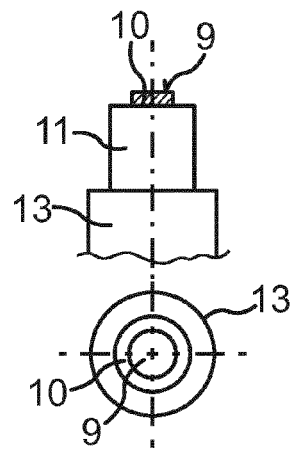 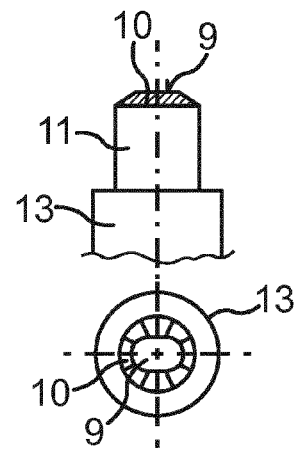
Fig.3d   Fig.3e   Fig.3f
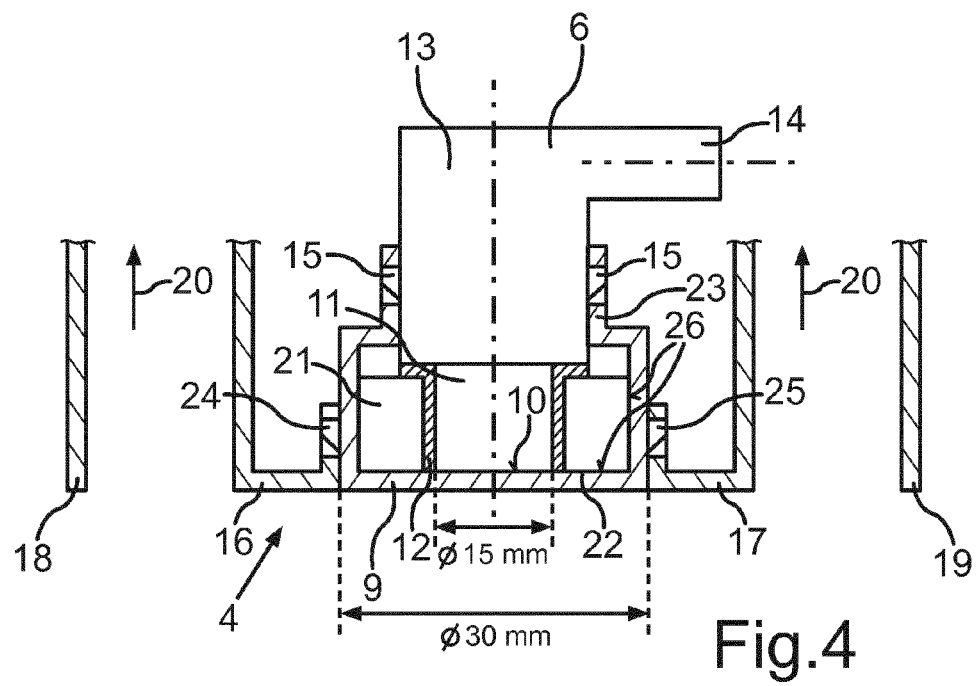
Fig.4

ULTRASONIC SENSOR ARRANGEMENT COMPRISING AN ULTRASONIC SENSOR IN THE RADIATOR GRILL, MOTOR VEHICLE AND CORRESPONDING METHOD

The invention relates to an ultrasonic sensor arrangement for a motor vehicle, comprising a trim element, in particular a bumper, comprising a radiator grill—in particular with at least one lamella—, and comprising at least one first and one second ultrasonic sensor each comprising a membrane for emitting and/or receiving ultrasonic signals, wherein the first ultrasonic sensor with its membrane is arranged on a back side of the trim element, in particular is in contact with it, so that the membrane of the first ultrasonic sensor emits and/or receives the ultrasonic signals through the trim element, and the second ultrasonic sensor is arranged on the radiator grill, in particular on at least one lamella of the radiator grill. The invention moreover relates to a motor vehicle with such an ultrasonic sensor arrangement, as well as a method for operating at least two ultrasonic sensors of a motor vehicle.

It is already prior art to equip a motor vehicle with a plurality of ultrasonic sensors. The ultrasonic sensors are commonly known to be mounted in the front portion as well as in the rear portion of the vehicle, namely in particular on the respective bumpers. They are assigned to driver assistance devices and provide information about the environment of the vehicle. Driver assistance devices can for instance be parking assistance systems, systems for monitoring dead angles, systems for keeping a distance, lane monitoring systems, braking assistance systems, and the like.

Ultrasonic sensors are known to have a pot-shaped membrane, which serves for emitting and receiving ultrasonic waves. The membrane is excited by a piezoelectric element to develop mechanic vibration; in the case of receiving an electrical voltage is tapped at the piezoelectric element, on the basis of which a distance from the obstacle is calculated.

It is already known that such ultrasonic sensors are built in uncovered in bumpers. This means that they are arranged in open recesses in the bumpers and are visible on the outside. In the case of ultrasonic sensors arranged in this way the directional emission characteristic is generated horizontally and vertically by the inner geometry of the aluminium pot (membrane) of the ultrasonic sensor. Because in the case of the visibly mounted sensors there is no obstacle interfering with the sound propagation, the function of the transducer, for instance recognition of hindrances when parking the vehicle, is not impaired.

The arrangement of the ultrasonic sensors in the open recesses in the bumper despite the large tolerances is sufficient for the uncovered transducers. For instance the ultrasonic sensor is fastened with the aid of a holder, which is pressed against the bumper and glued to it.

Moreover, from the prior art also ultrasonic sensors are known that are mounted to be concealed. These thus are not visible when viewing the bumper from the outside and are covered by the bumper. Here the membrane of the ultrasonic sensor is brought into contact with the back side of the bumper, wherein the ultrasonic signals are emitted or received through the bumper. This means that the transducer must be mechanically firmly fixed behind the bumper, without it being possible for the bumper to be equipped with a recess for this purpose. The two surfaces—namely that of the ultrasonic sensor, on the one hand, and that of the bumper, on the other hand—must now fit together at zero clearance and moreover can be even or else bent or curved. The ultrasonic sensor in this connection should be capable of loss-free emission through the bumper. In the case of sensors being mounted to be concealed behind the bumper, accordingly, essentially much higher requirements are given as to positioning, gluing, and the tolerances to be kept. In order to keep the losses involved in emission and receiving down, the emission surface of the ultrasonic sensor needs to be mechanically firmly fastened to the bumper or be formed with a loss-free coupling element between the emission surface or the front surface of the membrane, on the one hand, and the bumper, on the other hand.

A concealed arrangement of an ultrasonic sensor is known for instance from document DE 42 38 924 A1.

Now the interest focuses on a combination of a first ultrasonic sensor, which is arranged behind the trim element (in particular a bumper) in a concealed or hidden way, and a second ultrasonic sensor, which is attached on a radiator grill of the motor vehicle, that is on at least one lamella of the radiator grill. Such a combination from at least two differently mounted ultrasonic sensors in some systems proves to be required, and this is due to the concealed arrangement of the first ultrasonic sensor behind the bumper. In this connection it is aimed at using same ultrasonic sensors in order to minimize the number of the kinds of sensors required. This means that the ultrasonic sensor mounted in the radiator grill in terms of its design—and thus also in terms of its resonant frequency in the unmounted state—is equal to the ultrasonic sensor behind the bumper. Such an identical design of the two ultrasonic sensors, however, leads to it that the two ultrasonic sensors due to the different arrangements on the whole also have different radiation characteristics and moreover also the frequencies of the signals on both sides are different. This again leads to it that a cross measurement with the aid of the two ultrasonic sensors is not possible, because the one ultrasonic sensor cannot receive the signals of the other sensor. Moreover, thus also the evaluation of the signals is rendered more complex. All this is due to the fact that the emission behaviour of the ultrasonic sensor mounted behind the bumper is decisively influenced by the bumper material, whereas the other ultrasonic sensor has "free vision".

It is the task of the invention to provide a solution as how to be able to employ two same ultrasonic sensors in an ultrasonic sensor arrangement of the initially mentioned kind and still allow for a cross measurement, in which the one sensor can receive the ultrasonic signals of the other sensor.

This task according to the invention is solved by an ultrasonic sensor arrangement, by a motor vehicle, as well as by a method with the features according to the respective independent patent claims. Advantageous embodiments of the invention are subject matter of the dependent patent claims, the description, and the figures.

According to the invention an ultrasonic sensor arrangement for a motor vehicle comprises a trim element, in particular a bumper, as well as a radiator grill—in particular with at least one lamella—, as well as at least one first and one second ultrasonic sensor, each of which comprising a membrane configured for emitting and/or receiving ultrasonic signals. The first ultrasonic sensor is arranged with its membrane on the back side of the trim element, and in particular is in contact with the back side. The membrane of the first ultrasonic sensor thus emits and/or receives the ultrasonic signals through the trim element. By contrast, the second ultrasonic sensor is arranged on the radiator grill, namely in particular on at least one lamella of the radiator grill. According to the invention detuning means are provided, which are configured for detuning the second ultrasonic sensor and thus for adapting an emission and/or receiving behaviour of the second ultrasonic sensor to the emission and/or receiving behaviour of the first ultrasonic sensor.

The invention is based on several insights: To start with, it is based on the insight that in the case of a concealed arrangement of ultrasonic sensors behind the bumper or another trim element in some systems it is also required to position at least one ultrasonic sensor within the radiator grill. Further, the invention is based on the insight that in the case of same ultrasonic sensors a disadvantage consists in the fact that the trim element affects the emission frequency and also the radiation characteristic of the first ultrasonic sensor so that not only the membrane of this sensor, but also a region of the trim element resonates and the actual emission frequency thus is different from the actual resonant frequency of the ultrasonic sensor in the unmounted state, whilst the second ultrasonic sensor has "free vision" and its emission frequency thus basically corresponds to the resonant frequency of the membrane. The invention further is based on the insight that by the named disadvantage in the prior art it is not possible, either, to conduct a cross measurement (indirect measurement) with the two ultrasonic sensors, because the one ultrasonic sensor cannot receive the signals of the other ultrasonic sensor. The approach of the invention now is to detune or influence the ultrasonic sensor arranged in the radiator grill in terms of its emission frequency in such a way that its emission and/or receiving characteristic or its behaviour corresponds to the behaviour of the ultrasonic sensor arranged behind the trim element. This involves the advantage that same sensors can be used and thus the number of the required kinds of sensors is reduced to a minimum and despite the different arrangement of the ultrasonic sensors also cross measurements are possible, in which the one ultrasonic sensor emits ultrasonic signals, whereas the other ultrasonic sensor receives same signals.

The term radiator grill in the present case relates to a component, in particular a grille, which is arranged in front of the radiator in the front portion of the motor vehicle. Besides the function of the cooling air intake the radiator grill as a rule also has the function of vehicle design and thus increases the recognition value of a car make due to the often very characteristic design. The radiator grill is also known by the terms of "air intake slots", "radiator grill as make-specific design element", "radiator grille", "plastic ribs" as well as "plastic face plate".

This means that the emission and/or receiving behaviour of the second ultrasonic sensor is adapted to the behaviour of the first ultrasonic sensor. This means in particular that the second ultrasonic sensor is influenced in such a way that its radiation characteristic and/or emission frequency is adapted to the first ultrasonic sensor.

In one embodiment it is consequently envisaged in an advantageous way that the first and the second ultrasonic sensors are sensors with the same design or are identical sensors with same resonant frequencies in the unmounted state. Thus, the number of required types of sensors is minimal.

Preferably, with the aid of the detuning means a frequency of the ultrasonic signals emitted by the second ultrasonic sensor is adapted to the ultrasonic signals emitted by the first ultrasonic sensor. Thus, the ultrasonic signals on both sides exhibit same frequencies so that the two membranes vibrate at the same frequency. Thus, cross measurements with the two ultrasonic sensors are possible.

With regard to the design of the detuning means basically two different embodiments can be provided, which possibly can also be combined with each other: On the one hand, the emission and/or the receiving behaviour of the second ultrasonic sensor can be influenced with the aid of a disk-like detuning element, which is attached to a front surface of the membrane. Additionally or alternatively the detuning of the second ultrasonic sensor may also be effected electronically.

Accordingly, in one embodiment it is envisaged that the detuning means exhibits a disk-like detuning element, which is arranged to contact a front surface of the membrane of the second ultrasonic sensor. Such a plate-like or disk-shaped detuning element then influences the resonant frequency of the membrane and thus also resonates together with the membrane. In this way it is achieved to influence the behaviour of the second ultrasonic sensor and to adapt the behaviour of the first ultrasonic sensor without much effort.

Preferably, the detuning element is glued together with the front surface of the membrane. Thus, a reliable and slip-proof as well as secure to operate coupling of the detuning element to the membrane of the ultrasonic sensor is ensured. Moreover, thus the connection between the detuning element and the membrane is provided in the same way as it is the case between the other ultrasonic sensor and the trim element.

Preferably, the detuning element is formed from plastic. This embodiment makes use of the fact that, as is known, also trim elements of the motor vehicle can be formed from plastic. This embodiment thus allows for imparting the vibration technology properties of the trim element to the detuning element so that the second ultrasonic sensor can be influenced by the detuning element to the same extent as the first ultrasonic sensor by the trim element.

Therefore it is particularly preferred if the detuning element is formed from the same material as the trim element. Thus, it is achieved to influence the second ultrasonic sensor by the detuning element in the same way as the first ultrasonic sensor is influenced by the detuning element. Thus, on the whole same radiation characteristics as well as same emission frequencies are rendered, which allows for conducting the cross measurements, on the one hand, and also renders the electronic evaluation of the signals on both sides easier. Choosing the same material for the detuning element in particular also has the advantage that the vibration technology properties of the detuning element change in the same way in dependency on the ambient temperature as do the properties of the trim element. Thus, in particular the e-module of the detuning element changes in the same way as does the e-module of the trim element. Thus, the emission and/or receiving behaviour of the second ultrasonic sensor invariably stays the same as the behaviour of the first ultrasonic sensor, and this irrespective of the current temperature.

Additionally or alternatively, it may also be envisaged that the detuning element has the same thickness as the trim element in the portion on which the membrane of the first ultrasonic sensor is arranged. Thus, also the properties of the two ultrasonic sensors are adapted to each other.

In one embodiment it is envisaged that the ultrasonic sensor arrangement comprises one ring-shaped stiffening element—preferably formed from ceramic—, which is arranged around the pot-shaped membrane of the second ultrasonic sensor. The detuning element here may both be arranged to contact the front surface of the membrane of the second ultrasonic sensor as well as a front face of the stiffening element. Such a stiffening element has the advantage that thus the vibration of the membrane or the entire arrangement consisting of membrane and detuning element can be reduced to such an extent that the release time of the vibration of the membrane does not exceed a predetermined measuring window. With the aid of such a stiffening element thus the vibration period of the entire arrangement consisting of membrane and detuning element can be reduced to a still acceptable time. The stiffening element therein can be smaller than such a stiffening element of the first ultrasonic sensor, which is placed behind the trim element. By such smaller design of this stiffening element it is accomplished that the ultrasonic sensor does not attract attention in the radiator grill.

As has already been set out, the detuning of the second ultrasonic sensor can equally as well be performed electronically. For this purpose the detuning means may comprise an electronic control unit, which for detuning the second ultrasonic sensor operates same sensor at an excitation frequency, which differs from the resonant frequency of the ultrasonic sensor or from the natural frequency of the membrane. Thus, too, a reliable and good adaptation of the emission behaviour of the second ultrasonic sensor to the emission behaviour of the first ultrasonic sensor can be effected. In this connection it may even be envisaged that exclusively such an electronic detuning of the second ultrasonic sensor is effected, without a mechanic detuning element needing to be employed. Alternatively, however, the embodiment is preferred, in which partly an electronic detuning is performed and additionally also the second ultrasonic sensor is partly detuned with the aid of a detuning element. In this connection in an exemplary way 50% of the detuning can be achieved by an additional detuning element and equally 50% by a shifting of the excitation frequency of the second ultrasonic sensor.

The electronic detuning consequently is effected by the fact that the ultrasonic sensor is not excited at its resonant frequency or natural frequency but at a frequency that is different therefrom. Because this excitation frequency thus is different from the actual resonant frequency of the second ultrasonic sensor, the membrane is not ideally excited, either, and the emission or receiving performance is reduced. This embodiment is based on the following consideration: The invisible first ultrasonic sensor mounted behind the trim element in some circumstances (high attenuation due to the trim element with its high e-module) has a clearly higher attenuation in comparison with the second ultrasonic sensor, which has "a free vision". This means that a clearly raised performance can be emitted by the second ultrasonic sensor and the sensitivity of the sensor is also clearly higher in comparison. In other words, the second ultrasonic sensor also has a clear performance reserve. If this second ultrasonic sensor now is operated at an excitation frequency, which is different from the resonant frequency, the emission signal of this sensor can be adapted to the signals of the first ultrasonic sensor, without the second ultrasonic sensor being impaired as to its mode of functioning.

The control device can set the excitation frequency of the second ultrasonic sensor to a value at which the frequency of the ultrasonic signals emitted by this ultrasonic sensor is equal to the frequency of the ultrasonic signals of the first ultrasonic sensor.

The invention moreover relates to a motor vehicle with an ultrasonic sensor arrangement according to the invention.

A method according to the invention serves for operating at least two ultrasonic sensors of a motor vehicle, in which a first ultrasonic sensor is arranged with its membrane on the back side of a trim element, in particular a bumper, of the motor vehicle so that the membrane of the first ultrasonic sensor emits and/or receives ultrasonic signals through the trim element, and the second ultrasonic sensor is arranged on a radiator grill of the motor vehicle. By detuning means the second ultrasonic sensor is detuned and hereby its emission and/or receiving behaviour adapted to the emission and/or receiving behaviour of the first ultrasonic sensor.

The preferred embodiments presented with regard to the ultrasonic sensor arrangement according to the invention and their advantages apply in analogy to the motor vehicle according to the invention as well as to the method according to the invention.

Further features of the invention derive from the claims, the figures, and the description of the figures. All features and feature combinations previously named in the description as well as the features and feature combinations named in the following in the description of the figures and/or in the figures alone are employable not only in the respective indicated combination, but also in other combinations or else taken alone.

The invention now is set out in more detail by referring to individual preferred embodiments, as well as by referring to the enclosed drawings.

It is shown in:

FIG. 1 a schematic view of a motor vehicle according to an embodiment of the invention;

FIG. 2 a schematic sectional view of an ultrasonic sensor arrangement according to a first embodiment of the invention;

FIGS. 3a to 3f a schematic representation of various forms of a detuning element; and FIG. 4 a schematic sectional view of an arrangement according to a second embodiment of the invention.

In the figures same elements or elements having the same function are equipped with the same reference signs.

A motor vehicle schematically represented in FIG. 1 in the embodiment is a passenger car. The motor vehicle 1 comprises an ultrasonic sensor device or an ultrasonic sensor arrangement 2, which comprises a front bumper 3 as trim element, a radiator grill 4, as well as in the embodiment four ultrasonic sensors, namely two first ultrasonic sensors 5 as well as two second ultrasonic sensors 6. The first ultrasonic sensors 5 are arranged concealed or hidden behind the bumper 3 so that the membranes of the ultrasonic sensors 5 are in contact with the back side of the bumper 3 and ultrasonic signals are emitted or received through the unperforated bumper 3. The first ultrasonic sensors 5 here are lateral or external sensors, whereas the second ultrasonic sensors 6 are situated centrally between the two external first ultrasonic sensors 5.

The two ultrasonic sensors 6, by contrast, are arranged in the radiator grill 4, namely each on at least one lamella.

The number of the ultrasonic sensors 5, 6 is merely represented exemplarily in FIG. 1 and may be different depending on the embodiment. Accordingly, in the radiator grill 4 merely a single second ultrasonic sensor 6 may be provided; alternatively also three such sensors may be provided. Also the number of the first ultrasonic sensors 5 is merely exemplary.

All ultrasonic sensors 5, 6 are electrically coupled with an electronic control device 7, which calculates the distances from the obstacles on the basis of the received signals of the ultrasonic sensors 5, 6. The control device 7, which for instance is designed as micro controller, then for instance controls an output device 8, via which the measured distances are output. The output device 8 can be for instance a loudspeaker and/or an optical display.

All ultrasonic sensors 5, 6 in the embodiment example are same or identical sensors and thus also have same natural frequencies or resonant frequencies in the unmounted state. However, the emission frequency of the first ultrasonic sensors 5 due to the arrangement on the bumper 3 are changed by the material of the bumper 3. On the whole, also the radiation characteristics of these ultrasonic sensors 5 are changed by the bumper 3. Also, these properties change in dependency on the temperature, because the vibration technology properties of the bumper 3, in particular its e-module, changes with the temperature. By contrast, the second ultrasonic sensors 6 on principal have "free vision" and are not affected by the bumper 3. In such a constellation the cross-measurements between the first ultrasonic sensors 5, on the one hand, and the second ultrasonic sensors 6, on the other hand, and thus the precise determination of the position of an obstacle are not possible, because the first ultrasonic sensors 5 emit ultrasonic signals of a frequency that is not expected in the case of the ultrasonic sensors 6 or which cannot be received by these second ultrasonic sensors 6. For this reason in the embodiment measures are taken which ensure that the second ultrasonic sensors 6 are adapted in their emission and receiving properties to the first ultrasonic sensors 5. For this purpose detuning means are provided which adapt the emission frequency—i.e. the frequency of the emitted ultrasonic sensors—of the second ultrasonic sensors 6 to the emission frequency of the first ultrasonic sensors 5.

Making reference now to FIG. 2 the named detuning means in one embodiment can comprise a detuning element 9, which is a disk-like and plate-like element and is arranged on a front surface 10 of a membrane 11 of the second ultrasonic sensor 6 (also applies to all second ultrasonic sensors 6, which are arranged on the radiator grill 4), namely is in particular glued thereon. The detuning element 9 consequently is brought into contact with the front surface 10 of the membrane 11, through which the ultrasonic signals are emitted. The membrane 11 is an aluminium pot, around which a decoupling ring 12 is arranged from a soft elastic material. The membrane 11 in this connection protrudes from a housing 13 of the ultrasonic sensor 6, the housing comprising a plug 14 for connecting the ultrasonic sensor 6 to the control device 7. The housing 13 in this connection is latched via latch-in elements 15 between two lamellae 16, 17 or alternatively into a recess of a single lamella, wherein the latch-in elements 15 are latched into corresponding or complementary latch-in apertures in the lamellae 16, 17. The front surface 10 of the membrane 11 in this connection faces in the driving direction towards the front. Besides the named lamellae 16, 17 moreover further lamellae 18, 19 are provided so that between the lamellae 18 and 16 as well as 17 and 19 air can flow through for cooling the engine of the motor vehicle 1, as this is schematically shown in FIG. 2 by arrows 20.

With the aid of an adhesive connection the detuning element 9 is fastened to the front surface 10 of the membrane 11 at the front face. The detuning element 9 moreover is formed from the same material as is the bumper 3 and moreover has the same thickness as the bumper 3 in the portion of the first ultrasonic sensors 5. This thickness in the embodiment 3 is 3 mm.

By such a detuning element 9 in the second ultrasonic sensor 6 same emission and receiving conditions as in the first ultrasonic sensors 5 are created so that the ultrasonic signals on both sides are also sent out at the same frequency, and this irrespective of the prevailing temperature. If the properties of the bumper 3 change, also the properties of the detuning element 9 change. The bumper 3 as well as the detuning element 9 can therein be formed from plastic.

This means that by the detuning element 9 the second ultrasonic sensor 6 is influenced in such a way that it has the same emission and receiving behaviour as the first ultrasonic sensors 5. This means that the emission frequency of this sensor 6 is adapted to the emission frequency of the first sensors 5 or corresponds to this emission frequency.

In the embodiment according to FIG. 2 the detuning element 9 is merely in contact with the front surface 10 of the membrane 11. In this connection the surface of the detuning element 9 is smaller or maximally equal to the front surface 10 of the membrane 11. Various geometrical shapes of the detuning element 9 are therein shown in FIGS. 3a to 3f in more detail. As shown in FIG. 3a, the detuning element 9 can be a round disk, which is designed to have a rectangular cross-section. The diameter of this detuning element 9 in this connection can correspond to the diameter of the membrane 11. In the embodiment according to FIG. 3b the detuning element 9 is designed to be in the form of a round arch or bulgy, wherein the outer surface of the detuning element 9 represents a smaller portion of the surface of a ball. The detuning element 9 according to FIG. 3c essentially corresponds to that according to FIG. 3a and additionally exhibits rounded corners.

Further possible designs of the detuning element 9 are shown in FIGS. 3d to 3f, wherein below the respective lateral views also top views of the detuning element 9 and the front surface 10 of the membrane 11 are shown. In FIGS. 3d and 3e the detuning element 9 is designed to be smaller than the front surface 10 of the membrane 11. Whilst in FIG. 3e the detuning element 9 is designed to be circular with a smaller diameter than the membrane 11, the detuning element 9 according to FIG. 3d is designed to be oval, as can be seen in particular from the top view. The detuning element 9 according to FIG. 3f is oval and moreover has a chamfered edge.

Depending on the material of the bumper 3 or the detuning element 9 or else depending on the vibration technology requirements or depending on the optical requirements in some embodiments it may also be necessary to reduce the release time of the vibration of the membrane 11. For this reason in the embodiment according to FIG. 4 a ring-shaped stiffening element 21 formed from ceramic is employed, which is arranged around the decoupling ring 12 and thus around the membrane 11. This stiffening element 21 thus reduces the vibration of the membrane 11 in such a way that the release time of the vibration of the membrane 11 is reduced to a suitable value. Also, in this embodiment the detuning element 9 contacts the front surface 10 of the membrane 11, wherein this detuning element 9 in contrast to the embodiment according to FIG. 2 also extends across the entire front side 22 of the stiffening element 21 at the front face. Moreover, the detuning element 9 is now integrally formed with the holder 23, in which the stiffening element 21 is arranged, on the one hand, and also the housing 13 of the ultrasonic sensor 6 is latched-in, on the other hand, namely via the latch-in elements 15. This integrally formed holder 23 now is latched-in between the lamellae 16 and 17, and this via the latch-in elements 24 and 25. Here, too, the detuning element 9, which now represents a bottom of the holder 23, is formed from the same material as the bumper 3 and has the same thickness. Also the entire holder 23 can be formed from this material. The stiffening element 21 furthermore is connected with the holder 23 via an adhesive connection 26.

The holder 23 can be injection-moulded to the radiator grill 4 or else be designed as a separate component.

In FIGS. 2 and 4 it was shown how the emission and receiving behaviour of the second ultrasonic sensors 6 can be adapted to the emission and receiving behaviour of the first ultrasonic sensors 5. Additionally or alternatively it may also be envisaged that the electronic control device 7 itself adopts the function of detuning the second ultrasonic sensors 6. This can for instance be in the form that these second ultrasonic sensors 6 are operated at an excitation frequency that is different from the resonant frequency. This embodiment can for instance also be used for a partial detuning of the second ultrasonic sensors 6, whilst a further detuning with the aid of the detuning element 9 is conducted. As a result, the complete detuning is meant to lead to it that the frequency of the emitted ultrasonic signals of the second ultrasonic sensors 6 is equal to the frequency of the ultrasonic signals of the first ultrasonic sensors 5.

The invention claimed is:

1. An ultrasonic sensor arrangement for a motor vehicle comprising a trim element, in particular a bumper, comprising a radiator grill, and at least one first and one second ultrasonic sensor each comprising a membrane for emitting and/or receiving ultrasonic signals, wherein the first ultrasonic sensor is arranged with its membrane on a back side of the trim element so that the membrane of the first ultrasonic sensor is configured for emitting and/or receiving the ultrasonic signals through the trim element and the second ultrasonic sensor is arranged on the radiator grill, characterized by detuning means for detuning the second ultrasonic sensor and hereby for adapting an emission and/or receiving behaviour of the second ultrasonic sensor to the emission and/or receiving behaviour of the first ultrasonic sensor.

2. The ultrasonic sensor arrangement according to claim 1, characterized in that the first and the second ultrasonic sensors are sensors of the same design with same resonant frequencies in the unmounted state.

3. The ultrasonic sensor arrangement according to claim 1, characterized in that by the detuning means a frequency of the ultrasonic signals emitted by the second ultrasonic sensor is adapted to the frequency of the ultrasonic signals emitted by the first ultrasonic sensor.

4. The ultrasonic sensor arrangement according to claim 1, characterized in that the detuning means comprise a disk-like detuning element, which for detuning the second ultrasonic sensor is arranged to contact a front surface of the membrane of the second ultrasonic sensor.

5. The ultrasonic sensor arrangement according to claim 4, characterized in that the detuning element is glued together with the front surface of the membrane.

6. The ultrasonic sensor arrangement according to claim 4, characterized in that the detuning element is formed from plastic.

7. The ultrasonic sensor arrangement according to claim 4, characterized in that the detuning element is formed from the same material as the trim element.

8. The ultrasonic sensor arrangement according to claim 4, characterized in that the trim element has the same thickness as the trim element in the region with which the membrane of the first ultrasonic sensor is in contact.

9. The ultrasonic sensor arrangement according to claim 4, characterized in that the ultrasonic sensor arrangement comprises a ring-shaped stiffening element, which is in particular formed from ceramic and which is arranged around the pot-shaped membrane of the second ultrasonic sensor, wherein the detuning element is arranged to contact both the front surface of the membrane of the second ultrasonic sensor as well as a front side of the stiffening element.

10. The ultrasonic sensor arrangement according to claim 1, characterized in that the detuning means comprise an electronic control device, which for detuning the second ultrasonic sensor is configured to operate same sensor at a resonant frequency that is different from the excitation frequency.

11. The ultrasonic sensor arrangement according to claim 10, characterized in that the control device is configured to set the excitation frequency to a value at which the frequency of the ultrasonic signals emitted by the second ultrasonic sensor is equal to the frequency of the ultrasonic signals emitted by the first ultrasonic sensor.

12. A motor vehicle comprising an ultrasonic sensor arrangement according to claim 1.

13. A method for operating at least two ultrasonic sensors of a motor vehicle, in which a first ultrasonic sensor is arranged with its membrane on the back side of a trim element, in particular of a bumper, of the motor vehicle so that the membrane of the first ultrasonic sensor emits and/or receives ultrasonic signals through the trim element and the second ultrasonic sensor is arranged on a radiator grill of the motor vehicle, characterized in that by detuning means the second ultrasonic sensor is detuned and hereby its emission and/or receiving behaviour adapted to the emission and/or receiving behaviour of the first ultrasonic sensor.

\* \* \* \* \*